3,226,185
METHOD OF PREPARING AN ALKALI METAL DITHIONITE
Joseph A. Gyan and Thomas P. Whaley, Baton Rouge, La., assignors to Ethyl Corporation, New York, N.Y., a corporation of Virginia
No Drawing. Filed Nov. 9, 1961, Ser. No. 151,196
6 Claims. (Cl. 23—116)

Our object is to prepare alkali metal dithionites by a novel, facile process.

We accomplish this object by reacting an alkali metal borohydride with sulfur dioxide in a substantially anhydrous, essentially oxygen-free environment or atmosphere. This process readily produces the corresponding alkali metal dithionite in its desired commercial form—viz. free of water of hydration.

The alkali metal dithionites produced by this novel, facile process have the formula $M_2S_2O_4$, where M is an alkali metal, namely lithium, sodium, potassium, rubidium or cesium. These compounds are also known in the older literature as alkali metal hyposulfites or hydrosulfites. They find usage as reducing agents in vat-dyeing processes, as oxygen-scavenging agents for gases, and as chemical reductants in chemical syntheses. They have also been suggested for use in polymerization reactions. See, for example U.S. 2,391,218.

The alkali metal borohydride reactant is one or a mixture of lithium borohydride, sodium borohydride, potassium borohydride, rubidium borohydride and cesium borohydride. Sodium borohydride is preferred on a cost effectiveness basis.

The sulfur dioxide used in the present process can be in the gaseous form although it is preferable to use liquid sulfur dioxide since this gives rise to significantly higher yields of the desired alkali metal dithionite.

When using gaseous sulfur dioxide the reaction temperatures can range from about —9° C. to about 70° C., i.e. the temperature used is that at which sulfur dioxide is in the gaseous state and at which thermal decomposition of the alkali metal dithionite product does not occur. In the preferred embodiment where liquid sulfur dioxide is employed, the temperature is in the range of about —70° C. to about —10° C., depending, of course, upon the pressure prevailing in the reaction zone. In this connection, the reaction is preferably carried out at atmospheric pressure although reduced or elevated pressures can be used if desired. Thus in this preferred embodiment it is important only to use a temperature and pressure condition at which the sulfur dioxide remains substantially as a liquid.

Our novel reaction will work with widely divergent ratios of the reactants. Thus, either reactant can be used in very substantial excess if desired. However, it is preferable to use the sulfur dioxide in excess since this is the least expensive reactant. Also this simplifies the recovery and isolation of the desired alkali metal dithionite product. Thus upon permitting the excess sulfur dioxide to evaporate, the alkali metal dithionite is left in essentially pure form. Further, the evaporated sulfur dioxide can be easily liquefied for reuse in the process.

Our process produces a gaseous byproduct which is spontaneously inflammable when contacted with air. Hence, care should be used to conduct the present reaction in an essentially oxygen-free atmosphere which can be composed of such materials as gaseous sulfur dioxide, nitrogen, argon, helium, neon, krypton, methane, ethane, propane, and the like. If desired, the reaction can be carried out under vacuum conditions. In any event, this environment is substantially anhydrous so as to avoid premature decomposition of the alkali metal borohydride reactant and to avoid the solvation of the alkali metal dithionite product.

While the chemical identity of the gaseous byproduct has not been unequivocally established by means of rigorous chemical proof, all of the available experimental evidence definitely indicates that it is composed of a mixture of diborane and hydrogen. On this basis, the process of this invention can be considered of special value by virtue of the importance accorded to diborane in the chemical and allied arts.

As an example of the process of this invention approximately 1 to 2 grams of gaseous sulfur dioxide was slowly passed onto dry sodium borohydride for a period of 1 minute. Although the outward appearance of the system remained unchanged and no appreciable heat evolution was apparent, the presence of sodium dithionite in the reaction product was established by means of chemical analysis. One very convenient procedure for the semi-quantitative estimation of dithionite may be found in Analytical Chemistry, vol. 29, page 1499, October 1957. This analytical technique is specific to and characteristic of the dithionite moiety and establishes its presence beyond peradventure.

When conducting this gas phase-solid phase reaction it is preferable to utilize a mixing and grinding apparatus such as a ball mill so as to continuously expose a fresh surface of the alkali metal borohydride to the gaseous sulfur dioxide.

To illustrate the preferred embodiment involving use of liquid sulfur dioxide the following examples are presented. In one case 0.5 gram of sodium borohydride was dissolved in approximately 4 milliliters of liquid sulfur dioxide contained in a glass test tube cooled to a temperature of —70° C. The atmosphere above the surface of the reactants was initially composed essentially of gaseous sulfur dioxide. As the reaction proceeded this atmosphere became altered through the evolution of the gaseous byproduct referred to above. The readily-controlled reaction was found to produce a high yield of sodium dithionite.

In this preferred embodiment it is desirable to introduce the alkali metal borohydride reactant into the excess liquid sulfur dioxide in incremental portions and at a rate such that the reaction does not ocur too vigorously. As an example of this procedure, approximately 4 milliliters of sulfur dioxide was placed in a large test tube and grains of dry sodium borohydride were slowly dropped into the liquid until approximately 0.5 gram thereof had been added. Analysis of the product established that sodium dithionite had been produced in very good yield.

What is claimed is:
1. A process for the preparation of an alkali metal dithionite which comprises the step consisting of effecting contact between solid alkali metal borohydride and sulfur dioxide at a temperature in the range of from about —70° C. to about 70° C. and in a substantially anhydrous, essentially oxygen-free atmosphere.
2. The process of claim 1 wherein said borohydride is sodium borohydride.
3. The process of claim 1 wherein the sulfur dioxide is liquid sulfur dioxide.
4. The process of claim 1 wherein reaction is effected by introducing incremental portions of the alkali metal borohydride into excess liquid sulfur dioxide.
5. The process of claim 1 wherein said borohydride is sodium borohydride and the sulfur dioxide is liquid sulfur dioxide.

6. The process of claim 1 wherein said borohydride is sodium borohydride, the sulfur dioxide is liquid sulfur dioxide and reaction is effected by introducing incremental portions of the sodium borohydride into an excess of the liquid sulfur dioxide.

References Cited by the Examiner
UNITED STATES PATENTS

| 2,461,661 | 2/1949 | Schlesinger et al. | 23—14 |
| 2,991,152 | 7/1961 | Georrig et al. | 23—116 |

MAURICE A. BRINDISI, *Primary Examiner.*